United States Patent Office 2,711,219
Patented June 21, 1955

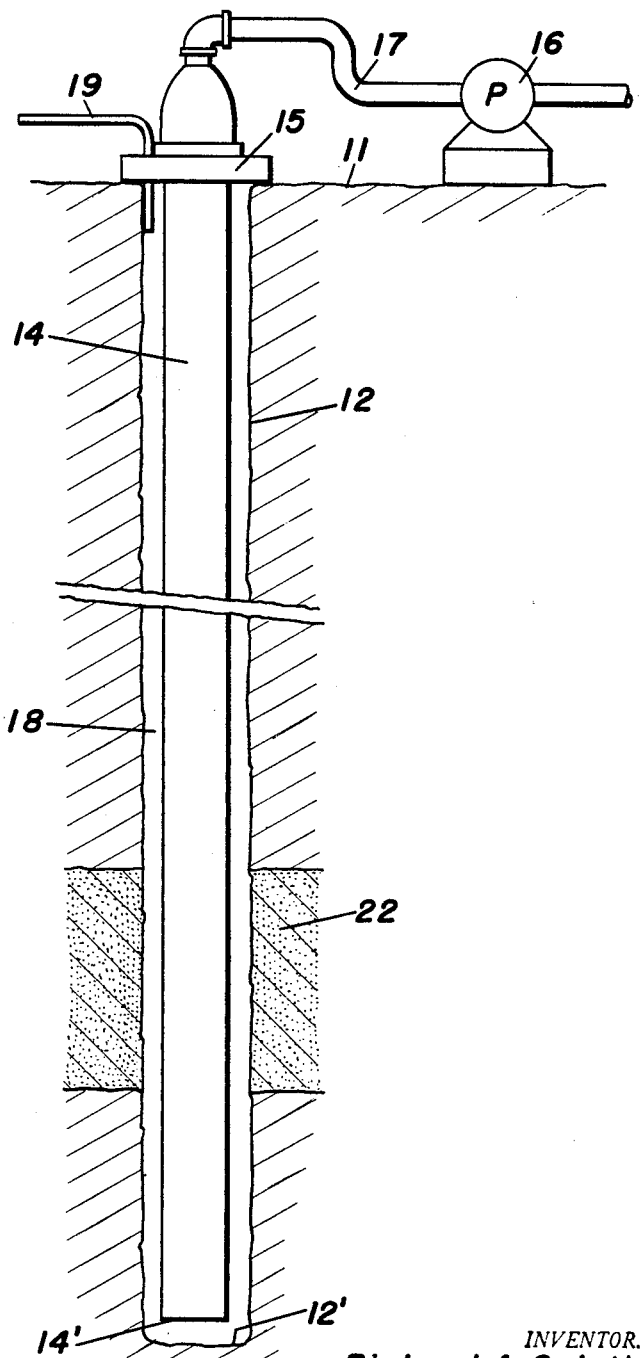

---

2,711,219
OIL WELL CEMENTING

Richard A. Salathiel, Houston, Tex., assignor, by mesne assignments, to Esso Research and Engineering Company, a corporation of Delaware Application October 20, 1951, Serial No. 252,280

16 Claims. (Cl. 166—31)

This invention relates to improvements in cements and in cementing operations. More particularly, it relates to an improved cementing composition for use in boreholes drilled for the production of fluids, particularly oil and gas, and an improved method of cementing such boreholes.

In drilling boreholes into subsurface formations for the production of fluids therefrom, cementing operations are normally resorted to before the well is finally completed and allowed to produce. The conditions under which such operations must be conducted are distinctively different from the conditions which ordinarily prevail when cement is used for other purposes, as, for example, in building construction. In building construction, the cement is usually poured into place as a very thick paste whereas in well cementing the cement must be sufficiently fluid to be pumped into place. Furthermore, in construction work aggregate materials, such as oyster shells, gravel, and sand are usually mixed in with the cement paste, whereas these materials are seldom used in well cementing. In building construction the cement slurry, when put in place, is usually permitted to set and harden at atmospheric temperatures and pressures. On the other hand, in cementing operations in boreholes drilled into subsurface formations the cement slurry must be such as will set satisfactorily at superatmospheric temperatures and pressures. Both pressure and temperature increase with depth of the hole. Fluid pressures of several thousand pounds per square inch are common, and temperatures of 300° F. and higher are sometimes encountered.

One type of cementing operation commonly conducted consists of cementing in place the steel casing used for lining the borehole walls. In carrying out this operation, after steel casing of the desired diameter has been run into the borehole, cementing material is introduced into the casing and forced around the lower end thereof into the annular space between the casing and the walls of the borehole. In this manner, the steel casing is firmly affixed to the surrounding earth formation, thereby preventing the passage of fluids around the outside of the casing.

In conducting cementing operations in boreholes drilled for the production of fluids from subsurface formations, there are three well-recognized types of cement which are normally employed. The first of these, and probably the most extensively employed, is construction-type Portland cement. Although the individual components in Portland cement vary somewhat with source of raw materials and method of manufacture, the term is used in the cement industry to indicate the type of cement ordinarily used in construction work. In addition to the ordinary construction grade of Portland cement, modified Portland cements designated as high-early-strength cement and slow-setting cement are sometimes used in cementing operations in connection with the drilling of boreholes into subsurface formations. Whatever type of cement is selected for accomplishing cement operations, the cement is admixed with water to form a slurry, the percentage of cement in the slurry being determined by the properties desired in the slurry.

In addition to cement and water, other materials are sometimes added for the purpose of amending the properties of the slurry. For example, it is known to add clay. It is also known to add iron oxide to the slurry. Furthermore, dispersing agents, such as polymerized sodium salts of substituted benzoic alkyl sulfonic acids, polymerized sodium salts of alkyl naphthalene sulfonic acids, soluble calcium lignin sulfonate, sodium lignin sulfonate, etc. are sometimes used. These added materials affect the viscosity, setting time, tensile strength and other characteristics of the slurry or the resulting hardened cement mass. However, one of the chief disadvantages of aqueous cement slurries, whether made by using construction-type, high-early-strength type or slow-setting type of Portland cements, with or without any of the above-mentioned amendatory agents added thereto, is that such slurries rapidly lose water by filtration into permeable subsurface formations.

Rapid loss of water by filtration from cement slurries used in cementing operations conducted when drilling into subsurface formations may cause considerable trouble. For example, when setting casing, cement slurry is pumped through the casing, around its lower edge, and upward into the annular space between the casing and the borehole walls. In this type of operation, it is necessary to fill the annular space completely in some cases and in others to fill it for a considerable distance above the bottom end of the casing. Slurries made from any of the above-mentioned cementing materials, despite their tendency to lose water rapidly, may be entirely satisfactory when the formations adjacent the casing are substantially impervious, since the slurry pumped into the casing and the hardened mass resulting therefrom will fill the annular space between the casing and the borehole wall to the desired height. However, serious difficulties are encountered when one or more of the formations adjacent the casing are pervious to the passage of fluid. When this condition exists, water from the cement slurry filters from the slurry into the pervious formation and partially dried cement tends to accumulate at the point or points on the borehole walls at which water is thus filtering. Since this partially dried cement slurry, although it tends to build up a cake on the pervious formation, does not prevent or hinder filtration of water therethrough, any slurry flowing by such point or points continues to lose water and more and more partially dried cement slurry tends to accumulate. Consequently, if a pervious formation is encountered between the lower end of the casing and the uppermost formation to be cemented, the above-referred-to cement cake may build up to such an extent as to prevent further passage of slurry past this point and a faulty cementing job results. This may leave a large quantity of cement slurry inside the casing which cannot be removed, and must be allowed to set. Considerable time and expense are involved in drilling out this set cement. Furthermore, in order to fill the annular space above this unwanted cement plug, various expedients must be resorted to, including that of piercing the casing above the cement plug and then pumping cement through the holes so pierced. Such expedients are time-consuming, expensive, and otherwise unattractive.

It is an object of the present invention to provide an aqueous cementing composition which tends to lose considerably less water to porous formations by filtration. It is a further object of my invention to provide a cementing material of increased fluidity and pumpability which at the same time has much less tendency to lose water by filtration than do conventional slurries. It is a further object of the present invention to provide an improved method of cementing casing in a borehole.

The composition of the present invention may be described briefly as a mixture comprising inorganic cementitious material, an aqueous liquid vehicle in which the cementitious material is dispersed or suspended, and a sufficient amount of a water-soluble salt of sulfonated phenol-formaldehyde condensation product to reduce the loss of water from the mixture by filtration. More specifically, the composition of my invention may consist of a dispersion or suspension of Portland cement, water, and a sufficient amount of a water-soluble salt of sulfonated phenol-formaldehyde condensation product to reduce the loss of water from the suspension or dispersion. Solid materials other than Portland cement may also be added to the composition. For example, it has been found that clay may advantageously be incorporated in the composition.

The method of the present invention may be described briefly as involving the addition to a mixture, dispersion, or suspension of an inorganic cementitious material in an aqueous liquid vehicle of a sufficient amount of a water-soluble salt of sulfonated phenol-formaldehyde condensation product to reduce the tendency of the mixture, dispersion, or suspension to lose water by filtration. More particularly, the method of the present invention may be described as involving the addition of a water-soluble salt of sulfonated phenol-formaldehyde condensation product to a cement mixture comprising Portland cement and water, said salt being added in sufficient quantity to reduce substantially the loss of water from the mixture by filtration.

The preparation of the aforementioned water-soluble salt of sulfonated phenol-formaldehyde condensation product is carried out in such a way as to result in a material having the desired filtration-reducing properties. The end product obtained is influenced by the nature of the starting materials used, the ratio of starting materials, the temperature at which the condensation reaction is conducted, and the reaction time. In order to prepare a water-soluble salt of sulfonated phenol-formaldehyde condensation product suitable for my purpose a sulfonated monocyclic aromatic compound, di-functionally reactive with formaldehyde, is condensed with formaldehyde to form a high molecular-weight, water-soluble product which is at least predominantly linearly polymeric. While many different sulfonated mono-cyclic aromatic compounds, di-functionally reactive with formaldehyde, may conceivably be employed, I have found sulfonated mono-cyclic phenolic materials eminently suitable. However, not all mono-cyclic phenolic materials are suitable for my purpose. For example, a phenol having a substituent group, other than the sulfonic acid residue, in a position ortho or para to the hydroxyl group contains only one position reactive with formaldehyde and will not, therefore, be capable of condensing with formaldehyde to give a high molecular weight product suitable for my purpose. On the other hand, a phenol containing a substituent group such as $CH_3-$, $C_2H_5-$, Cl, or the like, in the meta position may be mono-sulfonated and will still contain two positions reactive with formaldehyde and thus will be capable of forming high molecular weight predominantly linear condensation products with formaldehyde which are useful for my purpose.

Because phenol (mono-hydroxy benzene) is readily available and is convenient to handle, I have used phenol in the examples included herein. It will be understood, however, that other suitable phenolic components of the class cited above would have been equally applicable. The first step in the preparation of the water-soluble salt of sulfonated phenol-formaldehyde condensation products from phenol is the sulfonation of the phenol. The sulfonation step is so conducted that the amount of mono-sulfonated phenol is large while the amount of poly-sulfonated phenol and unsulfonated phenol is small. As is well known, the sulfonic acid residue in the mono-sulfonated phenol will be almost entirely in either the ortho or para position, with respect to the hydroxyl group, thus leaving two positions in the phenolic molecule reactive with formaldehyde. To insure that the sulfonated product resulting from the sulfonation of phenol with sulfuric acid is predominantly monosulfonated, phenol is reacted with a slight molar excess of sulfuric acid at 100° C. for one-half hour. Under these conditions the mono-sulfonated phenol will consist predominantly of para-sulfonated phenol. However, the conditions under which the phenol is sulfonated are not critical and the aforementioned temperature and reaction time were chosen as convenient conditions for securing a predominantly mono-sulfonated phenol.

On completion of the aforementioned sulfonation step, an aqueous solution of formaldehyde is incorporated in the reaction products of the sulfonation step in order to carry out the condensation between the formaldehyde and the sulfonated phenol. The remaining unreacted sulfuric acid from the sulfonation step acts as the catalyst for the condensation reaction. The temperature at which this condensation reaction is carried out does not appear to affect critically the properties of the resulting product. In the examples included herein, the condensation reaction temperature was arbitrarily chosen to give a conveniently short condensation time while at the same time not giving a reaction rate so rapid as to preclude the stopping of the condensation reaction at the desired stage. Condensation reaction temperatures up to 100° C. may suitably be employed although lower temperatures, for example, 60° C., also result in desirable products so long as the condensation reaction is allowed to proceed for a sufficient length of time.

During the condensation reaction, the reaction mixture becomes increasingly viscous due to the increase in chain length of the sulfonated phenolformaldehyde condensation product. Accordingly, it is necessary to permit the reaction to proceed until the molecular weight of the condensation product becomes sufficiently high, but the reaction must be terminated at the proper time so as to prevent the condensation product from increasing in molecular weight to the point of becoming insoluble in water. When the reaction mixture has attained the proper viscosity, the reaction is terminated. The condensation reaction may be terminated by diluting the reaction mixture with water and quickly neutralizing the diluted mixture with a suitable agent capable of neutralizing any remaining sulfuric acid and of reacting with the sulfonic acid radicals in the condensation product to form water-soluble metal salts of the condensation product. Ammonium hydroxide, calcium hydroxide, or an alkali metal hydroxide such as sodium, potassium, or lithium hydroxide may conveniently be employed in the neutralization step.

When the desired condition has been reached, the reaction may also be terminated either by limiting carefully the amount of formaldehyde added or by using only a slight excess of formaldehyde and adding a small amount of chemical (for example, phenol) capable of removing formaldehyde from the mixture. The solution of crude products is then neutralized.

Although the sulfonated phenol-formaldehyde condensation product employed in accordance with the present invention and hereinbefore described is predominantly linearly polymeric, it will be understood, of course, that there will be some cross linkage between the predominantly linearly polymeric chain structures. For example, if the sulfonated phenol from the sulfonation step contains some unreacted phenol or some meta-sulfonated phenol, there will be some cross linkage between the predominantly linearly polymeric chain structures because both of the aforementioned phenolic materials have three positions reactive with formaldehyde. Such cross linkages are not objectionable so long as the condensation product is predominantly linearly polymeric. On the other hand, if the sulfonated phenol from the sulfonation step contains disulfonated phenol (ortho- para- di sulfonated or di-ortho di-sulfonated phenol), there will be some phenolic materials present in the condensation reaction mixture which, due to having only one position reactive with formaldehyde, will serve to terminate chain growth by becoming the terminal group on the linear chain. It will be apparent, therefore, that an effort should be made to keep the di-sulfonated phenol content of the sulfonated phenol at a minimum so as to reduce the possibility of vicarious termination of chain length during the condensation step.

A water-soluble salt of sulfonated phenol-formaldehyde condensation product having filtration-reducing properties was prepared in the following manner:

In a 3-neck flask fitted with a stirrer and a thermometer 75 grams of phenol was heated at 100° C. for ½ hour with 100 grams of concentrated sulfuric acid. A solution in 152 cc. water of 50 cc. (53.4 grams) of U. S. P. formaldehyde (about 37.1% by weight of formaldehyde) was added dropwise (the addition requiring ½ hour) while maintaining the temperature at 85° C. Then 100 cc. more water was added and the mixture held at 95° C. for 40 minutes. The viscosity of the hot reaction mixture reached 3.5 cps. and then would go no higher. Two cc. more formaldehyde was added and heating continued (at 95° C.) for 105 minutes. The viscosity reached 8.5 cps. and then failed to go higher. Then 1.3 cc. more formaldehyde was added and heating continued for 40 minutes. Viscosity reached 16.5 cps. and increased no more. Addition of 0.6 cc. more formaldehyde and heating for an hour increased the viscosity to a stable value at about 38 cps. Adding 0.2 cc. more formaldehyde and heating for 50 minutes increased the viscosity to 75 cps. Then 0.2 cc. more formaldehyde was added (total added 54.3 cc.). This caused the viscosity to increase rapidly. It reached 150 cps. in 12 minutes and obviously would have gone much higher. The reaction was stopped at this time by adding a solution of 5 grams phenol and 2 grams water. The viscosity of the hot reaction mixture dropped to a stable value of 135 cps. The acidic solution was neutralized to a phenolphthalein end point by adding about 120 cc. of 40% caustic soda solution. The neutralized solution after dilution to 725 grams by addition of water had a viscosity at 26° C. of 122 cps.

The crude sodium salt of sulfonated phenol-formaldehyde prepared as described in the example contained as impurities sodium sulfate as well as low molecular weight organic materials. Roughly 40% of the solid content of the crude product was active material. If it is desired, the impurities may be removed from the active material by dialysis. The sulfonated phenol-formaldehyde condensation product may be obtained as a dry powder by evaporating the water solution of the material to dryness and pulverizing the residue. This applies to the crude product as well as the purified product.

Although the water-soluble salt of sulfonated phenol-formaldehyde condensation product described above is shown to be highly effective in reducing water loss by filtration from cement slurries, it is to be understood that it has been chosen as an illustrative example and that my invention is not limited to this particular compound. I have found my preparations of this material to be effective when condensation had been allowed to proceed to such an extent that 7.15% by weight in water of the material, based on the weight of phenol sulfonated, produced a solution having a viscosity at 26° C. of at least 5 centipoises. Where the preparations were such that the 7.15% aqueous solution showed less than 5 centipoises viscosity, their effectiveness was low or nonexistent. Preferably, the sulfonated phenol-formaldehyde condensation product should be such that its 7.15% aqueous solution will show a viscosity at 26° C. of not more than about 400 centipoises.

The amount of water-soluble salt of sulfonated phenol-formaldehyde condensation product required to give the desired reduction in loss of water by filtration from a suspension of inorganic cement in an aqueous liquid vehicle will vary with the circumstances over a reasonably wide range, and the amount employed in a specific cementitious mixture will depend upon the characteristics of the mixture. In general, between 0.2 weight per cent and 1.5 weight per cent of the pure salt, based on the weight of the cementing suspension or dispersion, will give satisfactory results. Ordinarily, less than about 0.1 weight per cent will give little reduction in loss of water by filtration. Although it will be found desirable in some instances to add more than 1.5% by weight, it will not be found advantageous to add more than 2.5% by weight. When employed in accordance with the present invention, the water-soluble salt of sulfonated phenol-formaldehyde condensation product (either the purified or the crude material) may be added in the form of a water solution or it may be added as a powder to either the mix water or to the dry cement.

It has been found that an especially desirable cement composition may be prepared by adding a water-soluble salt of a sulfonated phenol-formaldehyde condensation product to a cementitious mixture containing clay. It has been found that when clay is present in the cement mixture in an amount up to 35 parts by weight of clay to 100 parts by weight of inorganic cement along with the aforementioned salt, the resulting cement composition has little tendency to lose water.

In order to demonstrate the effectiveness of the composition of the present invention, a number of tests were made with various slurries of normal Portland cement, both with and without the purified sodium salt of sulfonated phenol-formaldehyde condensation product prepared in the manner hereinbefore described which was tested separately and in various combinations with two different kinds of clay. Where clay was added, it was dry mixed with the dry Portland cement before water was added thereto. Where the sodium salt of sulfonated phenol-formaldehyde condensation product was added, it was first dissolved in the mix water before the cement was added to the mix water. Filtration tests were made on each of the slurries thus prepared, and visual observations of consistency were also made. The results obtained are shown in Table I below, where the salt of the sulfonated phenol-formaldehyde condensation product is referred to as SPF:

TABLE I

*Effects of salts of sulfonated phenol-formaldehyde condensation products in cement slurries*

| Materials in Test Slurry, Grams | | | | Filter Medium | Test Results | | |
|---|---|---|---|---|---|---|---|
| S. P. F. | Clay | Cement | Water | | Viscosity of Slurry | Gel Strength of Slurry | Filtration Rate |
| 0 | 0 | 200 | 100 | Filter Paper | Medium | Medium | 30 cc. in 5 sec. |
| 4 | 0 | 200 | 96 | ___do___ | Low | Low | 6 cc. in 30 min. |
| 4 | 0 | 200 | 96 | Sand [3] | ___do___ | ___do___ | 35 cc. in 1½ min. |
| 0 | [1] 30 | 200 | 185 | Sand [4] | High | High | 62 cc. in 1½ min. |
| 4 | [2] 30 | 150 | 96 | Sand [3] | ___do___ | Low | 24 cc. in 30 min. |
| 2 | [2] 30 | 130 | 98 | ___do___ | Medium | ___do___ | 40 cc. in 1¾ min. |
| 6 | [2] 30 | 120 | 94 | ___do___ | ___do___ | ___do___ | 7 cc. in 30 min. |

[1] Aquagel clay (Wyoming bentonite clay).
[2] Baroco clay (a surface clay mined in Texas).
[3] Filter bed composed of equal parts of 40 to 60 mesh, 80 to 100 mesh, and 200 to 325 mesh sand.
[4] Filter bed composed of 50 to 70 mesh sand.

The above data show that the sodium salt of sulfonated phenol-formaldehyde condensation product markedly reduced the loss of water from the slurry when filter paper was used in the filter press for testing the filtration characteristics of the slurry. The data further show that when sand was used as the filter medium, 4 grams of the sodium salt of sulfonated phenol-formaldehyde condensation product was over 100% more effective than 30 grams of clay. It will be further noted that the addition of both clay and the sodium salt of sulfonated phenol-formaldehyde condensation product was especially effective in reducing the filtration rate of the cement slurry.

A second series of tests was made to demonstrate that the water-soluble salt of the sulfonated phenol-formaldehyde condensation product not only reduced loss of water by filtration from cement slurries but that this material increased fluidity and improved pumpability, particularly in the presence of clay. In each of these tests normal Portland cement was used. Where clay was used, it was added to the dry cement before water was added thereto. Where the sodium salt of sulfonated phenol-formaldehyde condensation product was used, it was first dissolved in the mix water before the cement was added to the mix water to form the slurry. The data obtained are included in Table II below:

TABLE II

*Effect of sulfonated phenol-formaldehyde on fluidity, filtration and pumpability of lone star normal Portland cement slurries with and without clay added*

| Cement Slurry Composition | | | Cement Slurry Properties | | | | | | | |
|---|---|---|---|---|---|---|---|---|---|---|
| Additives, Wt. Percent Based on Dry Cement | | W/C Ratio, Gms. Water/100 Gms. Cement | Fluidity, R. P. M. at 400 Gms. Stormer | Filtration,[2] Water Loss at 100 p. s. i., cc. | | | Time to 60 Poises, Refinery Supply Consistometer | | | |
| | | | | | | | Schedule No. 5[3] | | Schedule No. 9[4] | |
| Bentonite Clay | SPF[1] | | | 30 Sec. | 3 Min. | 30 Min. | Hr. | Min. | Hr. | Min. |
| 0 | 0 | 46 | 800 | 76 | ---- | ---- | 1 | 20 | 0 | 40 |
| 0 | 1 | 46 | 800 | 29 | 69 | ---- | 1 | 54 | ---- | ---- |
| 0 | 2 | 46 | 720 | ---- | ---- | ---- | >7 | [5]15 | 2 | 20 |
| 13 | 0 | 80 | 24 | 32 | 82 | ---- | ---- | ---- | ---- | ---- |
| 13 | 0 | 90 | 400 | 29 | 77 | ---- | 1 | 23 | 0 | 37 |
| 13 | 0 | 100 | 750 | 37 | 97 | ---- | ---- | ---- | ---- | ---- |
| 13 | 0 | 110 | 1,200 | ---- | ---- | ---- | 1 | 35 | ---- | ---- |
| 13 | 0 | 115 | 1,300 | 50 | 124 | ---- | ---- | ---- | ---- | ---- |
| 13 | 1 | 80 | 150 | 9 | 22 | 71 | ---- | ---- | ---- | ---- |
| 13 | 1 | 100 | 1,300 | 12 | 30 | 100 | ---- | ---- | ---- | ---- |
| 13 | 0.1 | 90 | 350 | ---- | 71 | ---- | 1 | 14 | ---- | ---- |
| 13 | 0.5 | 90 | 750 | 18 | 46 | ---- | ---- | ---- | ---- | ---- |
| 13 | 1.0 | 90 | 1,050 | 11 | 26 | 85 | 4 | 30 | ---- | ---- |
| 13 | 1.5 | 90 | 1,110 | 4 | 8 | 24 | ---- | ---- | ---- | ---- |
| 13 | 2.0 | 90 | 1,130 | 2 | 5 | 15 | >7 | [6]0 | 4 | 17 |
| 13 | 3.0 | 90 | 1,000 | ---- | ---- | 4 | 8 | ---- | ---- | ---- | ---- |

[1] Sodium salt of sulfonated phenol formaldehyde reaction product (purified by dialysis. Salts nil.)
[2] Tested in standard API low pressure, wall building mud tester. Supporting filter bed was ¾" thickness of sand composed of equal weights of 20–30 mesh, 50–70 mesh, 80–100 mesh, and 200–325 mesh.
[3] Tested according to well simulation depth of 8,000 ft. as per Schedule #5, API Code 32.
[4] Tested according to well simulated depth of 16,000 ft. as per Schedule #9, API Code 32.
[5] Slurry removed, placed in briquet molds and aged under water at 175° F. 8 day tensile strength—350 lbs./sq. in.
[6] Slurry removed, placed in briquet molds and aged under water at 175° F. 3 day tensile strength—190 lbs./sq. in.

Comparison of results obtained at comparable water-to-cement ratios shows the sodium salt of the sulfonated phenol-formaldehyde condensation product to be very effective in increasing fluidity and in reducing loss of water by filtration from the slurries containing clay. When present in cement slurries containing no clay, the sodium salt of the sulfonated phenol-formaldehyde condensation product appreciably reduced water loss but had relatively little effect on fluidity.

The pumpability data shown in Table II are particularly significant because pumpability results on ordinary commercial slow-setting cements have indicated that they thicken too quickly for safe use in deep, high-temperature wells. In contrast, the pumpability time of each of the slurries, both with and without clay, was markedly increased by the sodium salt of the sulfonated phenol-formaldehyde condensation product at simulated well depths of 8,000 and 16,000 feet.

The addition to cement slurries of various crude and purified water-soluble SPF preparations as powdered solids or as aqueous solutions reduced filtration rates of the slurries. The presence of a large amount of sodium sulfate impurity in the crude SPF caused the cement slurry to flash-set in some instances. When calcium hydroxide was used to neutralize the acid in preparing the crude SPF, the product did not cause flash-set because the resulting calcium sulfate impurity had no appreciable effect on the setting of the cement. It is possible in preparing the SPF to conduct the sulfonation operation in such a manner that very little sulphuric acid remains at the completion of the reaction. The crude SPF prepared in such a manner should contain insufficient sodium sulfate impurity to cause difficulty from flash-set in the slurry in which it is used.

The single figure of the attached drawing illustrates the procedure followed in cementing well casing. Referring to the drawing, numeral 11 designates the surface of the earth with a borehole 12 penetrating the earth and traversing a porous formation 22. Suspended within borehole 12 is casing 14 with its lower end 14' being positioned above the bottom 12' of the borehole 12. The upper end of casing 14 is provided with a casinghead designated by the numeral 15. The upper end of casing 14 is fluidly connected by means of conduit 17 with a pump 16. The annular space 18 between the walls of borehole 12 and the outer surface of casing 14 is provided with a conduit 19. Before cementing the well casing, the interior of the casing and the annular space 18 normally contain drilling mud. When it is desired to cement the casing, the cement composition of my invention is forced by pump 16 through line 17 into casing 14, displacing drilling mud therefrom around the lower edge 14' and upwardly through annular space 18. The cement slurry follows this same path and consequently passes around the lower edge 14' of casing 14 and upwardly through annular space 18. Just enough cement slurry should be used in this operation so that when the annular space 18 is filled with cement slurry, none, or only a small amount, of the cement slurry will remain in casing 14. This may be accomplished in several different ways, as, for example, by pumping into casing 14 just enough cement slurry to fill annular space 18 and then by forcing the cement slurry downwardly inside casing 14 by means of water or other fluid. After annular space 18 has been filled with cement, a sufficient time is allowed for the cement slurry to harden. When the borehole surrounding casing 14 has passed through a porous formation, such as that indicated by the numeral 22, the cementing composition of the present invention is particularly valuable because of its low filtration rate. When the cementing composition of the present invention is used, the slurry will flow past porous formation 22 without depositing a partially dried cake on the formation of sufficient thickness to interfere with the flow of slurry therepast and consequently the slurry will completely fill annular space 18.

While the cementing composition containing the soluble salt of the sulfonated phenol-formaldehyde condensation product has been described as applied to the cementing of well casing, it will be understood that it can be used for any purpose wherein a cement slurry having a low filtration rate is required. It can, of course, also be used for any purpose which requires a cement slurry of good pumpability and fluidity characteristics.

Having fully described the present invention, what I wish to claim as new and novel and to secure by Letters Patent is:

1. An aqueous slurry containing Portland cement to which has been added a water-soluble salt of sulfonated phenol-formaldehyde linear condensation product formed from a difunctional monocyclic phenol in an amount in the range between 0.2% and 2.5% by weight of the cement slurry, said salt containing an insufficient amount of sodium sulfate to cause flash-setting of said slurry.

2. An improved composition for well cementing comprising Portland cement, water, clay and a water-soluble salt of sulfonated phenol-formaldehyde linear condensation product formed from a difunctional monocyclic phenol in an amount in the range between 0.2% and 2.5% by weight of the Portland cement, water, and clay, said salt containing an insufficient amount of sodium sulfate to cause flash-setting of the composition.

3. An improved composition for well cementing comprising Portland cement, water and a water-soluble salt of sulfonated phenol-formaldehyde linear condensation product formed from a difunctional monocyclic phenol in an amount in the range between 0.2% and 2.5% by weight of the Portland cement and water, said salt containing an insufficient amount of sodium sulfate to cause flash-setting of the composition and being characterized by its ability to form an aqueous solution having a viscosity of at least 5 centipoises measured at 26° C. when added to water in a concentration of 7.15% by weight, said concentration being based on the amount of phenol reacted.

4. An improved composition for well cementing comprising Portland cement, water, and a water-soluble salt of a linear condensation product formed by reacting sulfonated phenol and formaldehyde, said salt being characterized by its ability to form an aqueous solution having a viscosity of at least 5 centipoises measured at 26° C. when added to water in a concentration based on the amount of phenol reacted to form said sulfonated phenol, said phenol being a difunctional mono-cyclic phenol in an amount in the range between 0.2% and 2.5% by weight of the Portland cement and water, said salt containing an insufficient amount of sodium sulfate to cause flash-setting of the composition.

5. A composition in accordance with claim 4 in which the water-soluble salt is an alkali metal salt.

6. A composition in accordance with claim 4 in which the water-soluble salt is the calcium salt.

7. A composition in accordance with claim 4 in which the water-soluble salt is an ammonium salt.

8. A composition in accordance with claim 1 in which the water-soluble salt is an alkali metal salt.

9. A composition in accordance with claim 1 in which the water-soluble salt is a calcium salt.

10. A composition in accordance with claim 1 in which the water-soluble salt is an ammonium salt.

11. In the method of cementing a casing in a well which comprises pumping down through the casing and upwardly into the annular space between the casing and the borehole an aqueous Portland cement slurry, the step of adding to the cement slurry a water-soluble salt of a sulfonated phenol-formaldehyde linear condensation product formed from a difunctional monocyclic phenol in an amount ranging between 0.2 and 2.5 per cent by weight based on the weight of the slurry, the phenol from which said condensation product is made being a mono-cyclic phenol.

12. A method in accordance with claim 11 in which said water-soluble salt is prepared under such conditions that a water solution of the salt of 7.15 per cent concentration, based on the amount of said phenol reacted, will have a viscosity of at least 5 centipoises when measured at 26° C.

13. A method in accordance with claim 11 in which the water-soluble salt is an alkali metal salt.

14. A method in accordance with claim 11 in which the water-soluble salt is a calcium salt.

15. A method in accordance with claim 11 in which the water-soluble salt is an ammonium salt.

16. A method in accordance with claim 11 in which the phenol is monohydroxybenzene.

References Cited in the file of this patent

UNITED STATES PATENTS

| | | |
|---|---|---|
| 1,972,207 | Tucker | Sept. 4, 1934 |
| 2,457,160 | Kurtz et al. | Dec. 28, 1948 |
| 2,492,212 | Dailey | Dec. 27, 1949 |
| 2,512,716 | Courtney | June 27, 1950 |
| 2,546,624 | Adams | Mar. 27, 1951 |
| 2,549,507 | Morgan et al. | Apr. 17, 1951 |

FOREIGN PATENTS

| | | |
|---|---|---|
| 231,242 | Great Britain | Mar. 30, 1925 |
| 15249/1933 | Australia | Nov. 21, 1933 |